United States Patent
Poffenbarger

(10) Patent No.: US 10,462,114 B2
(45) Date of Patent: *Oct. 29, 2019

(54) SYSTEM AND ASSOCIATED SOFTWARE FOR PROVIDING ADVANCED DATA PROTECTIONS IN A DEFENSE-IN-DEPTH SYSTEM BY INTEGRATING MULTI-FACTOR AUTHENTICATION WITH CRYPTOGRAPHIC OFFLOADING

(71) Applicant: Definitive Data Security, Inc., El Cerrito, CA (US)

(72) Inventor: John Poffenbarger, El Cerrito, CA (US)

(73) Assignee: DEFINITIVE DATA SECURITY, INC., El Cerrito, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,389

(22) Filed: Dec. 26, 2017

(65) Prior Publication Data

US 2018/0109504 A1    Apr. 19, 2018

Related U.S. Application Data

(63) Continuation-in-part of application No. 14/927,346, filed on Oct. 29, 2015, now Pat. No. 9,961,048.
(Continued)

(51) Int. Cl.
*H04L 29/06* (2006.01)
*H04L 9/32* (2006.01)
(Continued)

(52) U.S. Cl.
CPC ........ *H04L 63/0485* (2013.01); *H04L 9/0637* (2013.01); *H04L 9/0861* (2013.01);
(Continued)

(58) Field of Classification Search
CPC .......... H04L 2463/082; H04L 63/0428; H04L 63/0807; H04L 9/0637; H04L 9/0861; H04L 9/32
See application file for complete search history.

(56) References Cited

U.S. PATENT DOCUMENTS

| | | | |
|---|---|---|---|
| 7,379,731 B2 * | 5/2008 | Natsuno .................. | G06F 21/10 455/412.1 |
| 2003/0041255 A1 * | 2/2003 | Chen ....................... | G06F 21/54 713/193 |
| 2009/0203355 A1 * | 8/2009 | Clark ...................... | G06F 21/32 455/411 |

(Continued)

*Primary Examiner* — Joseph P Hirl
*Assistant Examiner* — Sayed Aresh Beheshti Shirazi
(74) *Attorney, Agent, or Firm* — Haverstock & Owens LLP

(57) ABSTRACT

The advanced data protection system is implemented by distributing data encryption across multiple isolated computing systems and using multi-factor authentication to access remote, protected decryption material. Architectural components include: Client application software reading/writing from/to a client data store executing on a client host computer, client application plug-ins communicating with external authentication devices, server application software reading/write data from/to a server data store executing on a host computer which is physically or virtually isolated from the client host computer, authentication devices, components, or systems integrated with or connected to the client computer and exposing programmatic interfaces to client application software, and secure networking components executing on both hosts that provide secure data exchange. The system employs certain associated software that incrementally encrypts client data on both the client and server, storing portions of the results on each computer, and requiring multi-factor authentication for distributed decryption material recovery.

34 Claims, 8 Drawing Sheets

Related U.S. Application Data

(60) Provisional application No. 62/047,048, filed on Sep. 7, 2014.

(51) Int. Cl.
*H04L 9/06* (2006.01)
*H04L 9/08* (2006.01)

(52) U.S. Cl.
CPC .......... *H04L 9/0894* (2013.01); *H04L 9/3228* (2013.01); *H04L 9/3234* (2013.01); *H04L 2463/082* (2013.01)

(56) References Cited

U.S. PATENT DOCUMENTS

| | | | | |
|---|---|---|---|---|
| 2010/0205448 A1* | 8/2010 | Tarhan | ............. | G06F 21/33 713/185 |
| 2010/0208889 A1* | 8/2010 | Humphrey | ............. | G06F 21/602 380/44 |
| 2010/0217975 A1* | 8/2010 | Grajek | ............. | G06F 21/445 713/157 |
| 2011/0082799 A1* | 4/2011 | Parduhn | ............. | G06Q 20/20 705/75 |
| 2012/0143765 A1* | 6/2012 | Yamaguchi | ............. | G06F 21/10 705/52 |
| 2013/0275306 A1* | 10/2013 | Ignatchenko | ...... | G06Q 20/3825 705/44 |
| 2014/0208117 A1* | 7/2014 | Hayashi | ............. | H04L 63/0471 713/171 |
| 2014/0331279 A1* | 11/2014 | Aissi | ............. | G06F 21/53 726/1 |
| 2014/0359484 A1* | 12/2014 | Morecki | ............. | G06F 3/0481 715/753 |
| 2016/0226827 A1* | 8/2016 | Bohannon | ............. | H04L 63/0281 |

* cited by examiner

SYSTEM AND ASSOCIATED SOFTWARE FOR PROVIDING ADVANCED DATA PROTECTIONS IN A DEFENSE-IN-DEPTH SYSTEM BY INTEGRATING MULTI-FACTOR AUTHENTICATION WITH CRYPTOGRAPHIC OFFLOADING

RELATED APPLICATION

This application is a continuation-in-part application of co-pending U.S. patent application Ser. No. 14/927,346, filed on Oct. 29, 2015, and titled "A SYSTEM AND ASSOCIATED SOFTWARE FOR PROVIDING ADVANCED DATA PROTECTIONS IN A DEFENSE-IN-DEPTH SYSTEM BY INTEGRATING MULTI-FACTOR AUTHENTICATION WITH CRYPTOGRAPHIC OFFLOADING," which claims priority under 35 U.S.C. § 119(e) of the co-owned U.S. Provisional Patent Application No. 62/047,048, filed Sep. 7, 2014, titled, "A system and associated software for providing advanced data protections in a defense-in-depth system by integrating multi-factor authentication with cryptographic offloading," which are hereby incorporated by reference in their entireties for all purposes.

FIELD OF THE INVENTION

The present invention relates generally to a system and associated software for providing advanced data protections in a defense-in-depth system by integrating multi-factor authentication with cryptographic offloading.

BACKGROUND OF THE INVENTION

Historically, computer users have been able to operate their computers without great concern of compromise; if in the past the computer was subjected to a virus, worm, or even malware, it was pretty clear, and the user could take measures, however painful, to eradicate the threat. This permitted businesses and individuals the freedom to focus on securing sensitive data transmission, with limited concern for local storage.

Recent dynamics have greatly changed. It is no longer fair to assume a host computer is operating free of malicious or unwanted applications, and data indicates this can go on for months without anyone's knowledge. Existing data protection mechanisms were not designed to operate in this situation, thus stored data is at great risk to compromise.

For example, full disk encryption does not protect against remote network attacks; credentials are provided during system boot or through other means, unlocking the system such that the operating system presents decrypted data to the user—and also to an attacker. File encryption provides a common measure of protection, though on compromised systems user input is subjected to undetected key logging malware, which gives up valid and useful credentials to unauthorized users, and thus decryption keys. At the same time, encrypted data must be decrypted and utilized in unprotected plaintext, exposing content to attackers lying in wait. Token-based authentication provides a measure of insulation from local attacks, though often active tokens are left connected to host computers for extended periods of time, diminishing their value. Even still, many token implementations utilize local keyboard input to enable their behavior, which is also susceptible to malware key loggers.

Offloading cryptographic keys and operations for Encryption, Access Control, and Policy Management, helps, so long as the keys are remotely generated though this is not always the case. Even still, most systems utilize local credential input which defeats the additional protections provided by such an approach. Furthermore, most cryptographic operations are performed locally, which provides visibility, if even momentarily, to keying material and credentials that can be compromised. Phones used as second-factor authenticators provide a reasonable amount of extra protection, though are typically connected to the same subnet as the host computer with sensitive data, and are fairly easily compromised with targeted remote network attacks.

Most of these solutions have been suitable in the past, but not today. Though proper measures exist to protect against these threats, they are often disruptive to user workflows and not suitable for frequent operations.

SUMMARY OF THE INVENTION

The present invention advantageously fills the aforementioned deficiencies with a system and associated software for providing advanced data protections in a defense-in-depth system by integrating multi-factor authentication with cryptographic offloading which protects sensitive data on unsecured hosts. The resulting solution provides a mechanism securing sensitive data while providing isolated, protected access to plaintext content using native application containers, without exposing plaintext to additional system components, while also delivering instant, on-demand, definitive data disclosure risk insight and deterministic data flow identification information for external system consumption and use.

The present invention is a system together with an associated computer process, made up of the following: Client application software (client app), a client file system driver, a secure client data store (client store), and client application plug-ins communicating with external authentication devices, each running on a host (client) computer; Server application software (server app) and a secure server data store (server store), running on a host (server) computer physically and/or virtually separated from the host computer; Authentication devices, components, or systems integrated with or connected to the client computer and exposed to client application software through operating system and third-party software interfaces; and Secure networking components running on both client and server computers facilitating secure data exchange.

The present invention implements multi-factor authentication, access control, data integrity protection, policy management, encryption, and decryption to protect data stored on a client host computer (local data).

For authentication, the client application reads policy information from the client store to acquire authentication tokens from various authentication mechanisms by directly querying the user for a password and/or calling into plug-in software interfacing with external devices. The client application uses secure networking components to transmit this information to the server application, where it verifies the user's identity and authorizes operation, offloading access control and policy management. The results of this process are, with secure networking components, returned to the client application which, with the server application, creates a (potentially separate) protected communications channel for use during the remainder of a single encryption/decryption transaction. This is a prerequisite for the client and server to execute coordinated encryption/decryption operations; if the server application cannot authorize the user, the response does not set up the proper protected session. Note that the resulting solution implements End to End Encryption as a result of decoupling material protection from the secure communications channel, a standard practice for proper secure data transmission.

For encryption, the client application creates a unique protected (client) data identifier and other cryptographic inputs, and stores them in a protected data container securely stored in the client store. The client application also creates ephemeral and other encryption key(s), securely stored in a separate part of the client store, and begins to encrypt source material a block at a time. By using secure networking components and a secure network channel negotiated as a result of server application authentication previously described, the client application periodically sends (offloads) an encrypted (or plaintext) block of material and cryptographic inputs to server application software on a remote (server) host. The server application uses this cryptographic input and encrypted (or plaintext) data, generates (or optionally retrieves, if not the first time for a given encryption operation) ephemeral and other cryptographic key(s) associated with and unique and specific to the current operation and source data, and again encrypts the block of data storing this, the client data identifier, associated cryptographic input parameters, and encrypted text in a data container in the secure server store while also storing the cryptographic key(s) in (a potentially separate) secure portion of the server store and storing an event with associated client/server data. The server application then securely returns the results of this operation to the client application, using the same encrypted channel previously noted, where results are used as input to continue block encryption. This process continues, with either continuous or periodic block data offloading, until all material is encrypted, at which point the encrypted material is added to the data container in the client store. The client application then removes all plaintext source material, registers the resulting ciphertext file with a file system driver, setting up dynamic monitoring of file system access to enciphered content, while the secure networking channel and all its cryptographic parameters are destroyed.

The resulting single, partially double or completely double encrypted data content is composed of an "outer" data container, with data encrypted using (a) unique server-generated and server-stored cryptographic key(s), and an "inner" data container encrypted using the securely stored client cryptographic key(s).

For decryption, the client application and server application after establishing the secure channel through authentication previously described, implement the expected reverse of these proceedings with proper decryption and offloading coordination. At the completion of decryption, the client application removes all ciphertext and associated cryptographic material and also securely acknowledges this operation with the server application, which optionally does the same with some, none, or all related materials. The secure networking channel tears itself down when this expected data exchange and acknowledgment has been transmitted.

For secured access, the aforementioned driver detects access to ciphertext data files and notifies the client of the request, at which point the client consults the local policy configuration to determine whether or not to initiate protected access. When this occurs, the client software interrupts, through coordination with the file system driver, further access to ciphertext data on the mass storage device, makes note of the process initiating the transaction, then initiates the decryption process with the aforementioned authentication, authorization, and decryption steps. Once data is decrypted, however, the file system driver coordinates replacement of ciphertext with plaintext, then releases pending requests from the original application while denying all other requests from other applications, potential malware, and system components. This results in native plaintext access for the primary, initiating application, while providing continuous protections for the resulting plaintext result which can now be natively modified. When the application container closes the file, the file system driver retains control of the plaintext file and initiates re-encryption, using all new host and server encryption materials, replacing the plaintext with ciphertext before finally releasing the file for access by all applications and system components. This allows the resulting ciphertxt file to be copied, renamed, attached to email, etc., resulting in a seamless and non-intrusive protective capability that is not specific to host application software. This procedure is referred to as, "In-Place Encryption."

The present invention system is unique when compared with other known systems and solutions in that it provides multi-factor authentication for file-based data access, an optional physical presence requirement for at least one authentication factor, data re-encryption when users and/or processes are no longer using temporarily decrypted material, near-seamless presentation and use of encrypted data files, on-demand data access event history, zero-configuration secure data collaboration, and on-demand restoration of protected files. Similarly, the associated software is unique when compared with other solutions in the way it encapsulates protected data to provide a seamless and near-native user experience, hiding the encrypted file and presenting it as a native plaintext original, decrypting information in concerted fashion only when the plaintext material is required and after user identity is authenticated and access authorized by server resources, while at the same time denying plaintext access to external applications and system components, providing secure access to plaintext content with continuous protection from local host threats.

The present invention is unique in that the overall architecture of the system is different from other known systems. More specifically, the present invention system is unique in the way it secures data access event information to provide on-demand data exposure information at any time, provides universally unique content identifiers that can be used by data loss prevention and unified threat management systems to deterministically identify the content of information traversing its components, the way the client and server manage independent and unique uncoupled encryption and decryption keys, and the way it tracks data with a universally unique identifier attached to protected data containers for every encryption operation. Similarly, the software of the present invention is unique when compared with other known solutions in that it provides data protection on hosts compromised with malware such as key loggers and memory scrapers, and/or hosts that utilize credentials which have been stolen by malicious actors.

The invention includes a system and associated software:
  to provide advanced data protections in a defense-in-depth system by integrating multi-factor, physical presence authentication with cryptographic offloading that does not suffer from common and traditional problems or deficiencies associated with prior solutions,
  to provide advanced data protections while minimizing disruptions to typical user workflows,
  to provide continuous, secured, and native host application access to plaintext content while protecting from exposure to external applications, system components, and/or local malware, to utilize industry-standard multi-factor authentication to inhibit malicious intruders, to independently and uniquely mark protected data so it can be deterministically identified by monitoring systems, and to provide quick and easy access to deterministic data exposure information for all protected data.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE PREFERRED EMBODIMENT

A system and associated software for providing advanced data protections in a defense-in-depth system by integrating multi-factor authentication with cryptographic offloading is described herein.

Figure 1:
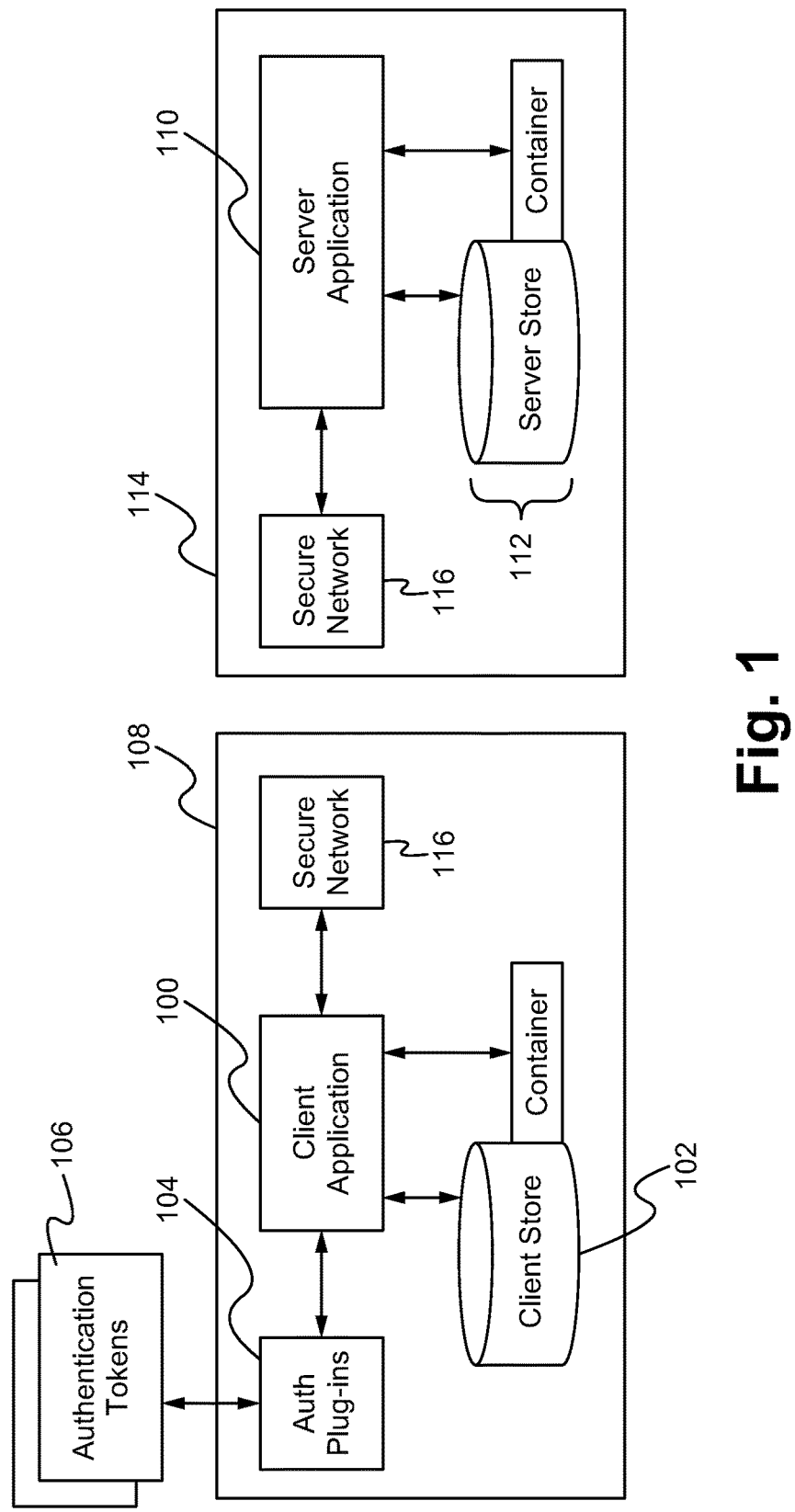
FIG. 1 shows an embodiment of the advanced data protection system.

FIG. 1 shows an embodiment of the advanced data protection system. The advanced data protection system is a system together with an associated computer process, made up of the following: Client application software (client app) 100, a secure client data store (client store) 102, and client application plug-ins 104 communicating with external authentication tokens 106, each running on a host (client) computer 108; Server application software (server app) 110 and secure server data store (server store) 112, running on a host (server) computer 114 physically and/or virtually separated from the host client computer 108; authentication tokens 106, components, or systems integrated with or connected to the client computer 108 and exposed to client application software 100 through operating system and third-party software interfaces; and secure networking components 116 running on the client computer 108 and the host computer 114 facilitating secure data exchange, and interacting with client and server application software.

Figure 2:
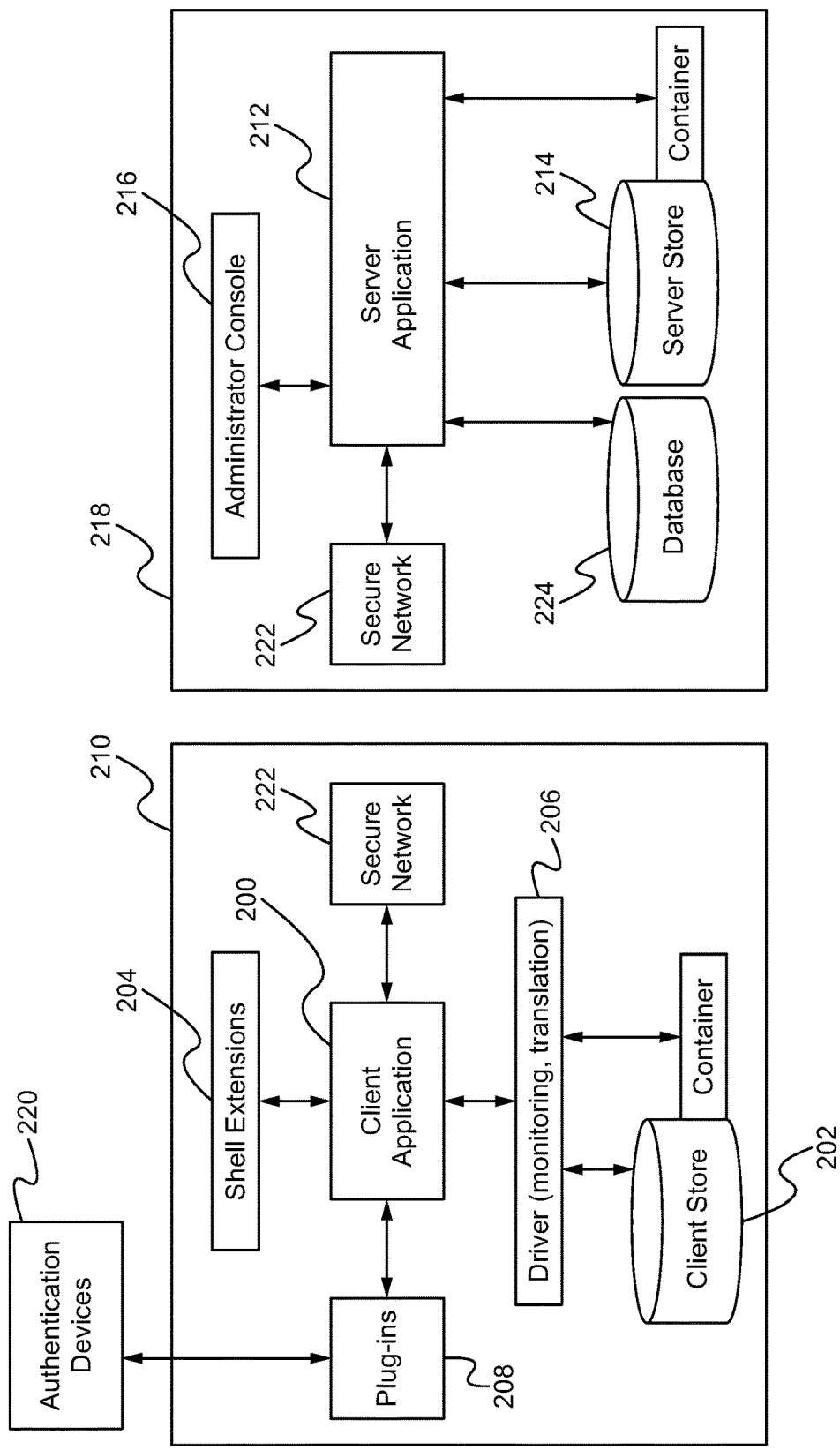
FIG. 2 shows an embodiment of the advanced data protection system.

FIG. 2 shows an embodiment of the advanced data protection system. The advanced data protection system is a system together with an associated computer process, made up of the following: Client application software (client app) 200, a secure client data store (client store) 202, shell extension software 204 communicating with the client application 200, a driver 206 communicating with the client application 200 and secure client data store 202, and client application plug-ins 208 communicating with external authentication devices, each running on a host (client) computer 210; Server application software (server app) 212, secure server data store (server store) 214, and an administrator console 216 communicating with the server application software 212, running on a host (server) computer 218 physically and/or virtually separated from the host client computer 210; Authentication devices 220, components, or systems integrated with or connected to the client computer 210 and exposed to client application software 200 through operating system and third-party software interfaces; and Secure networking components 222 running on both client and server computers facilitating secure data exchange, and interacting with client and server application software. The server application 212 also accesses a database 224 which stores any type of information. Although the administrative console 216 is shown on the host (server) computer 218 in FIG. 2, the administrative console 216 is able to be implemented on any device, securely communicating using the secure network 222.

The advanced data protection system implements multi-factor authentication, access control, data integrity protection, policy management, encryption, and decryption to protect data stored on a client host computer (local data).

For encryption, a user through the shell extension software right-clicks on a file and from the menu, chooses to protect the target, at which point the shell extension calls the client application with the target filename as a parameter. The client application then proceeds to initiate client encryption, secure transmission to the server, server encryption, event storage, double-encrypted (or optimized) data secure transmission back to the client, for use and/or storage.

Figure 3:
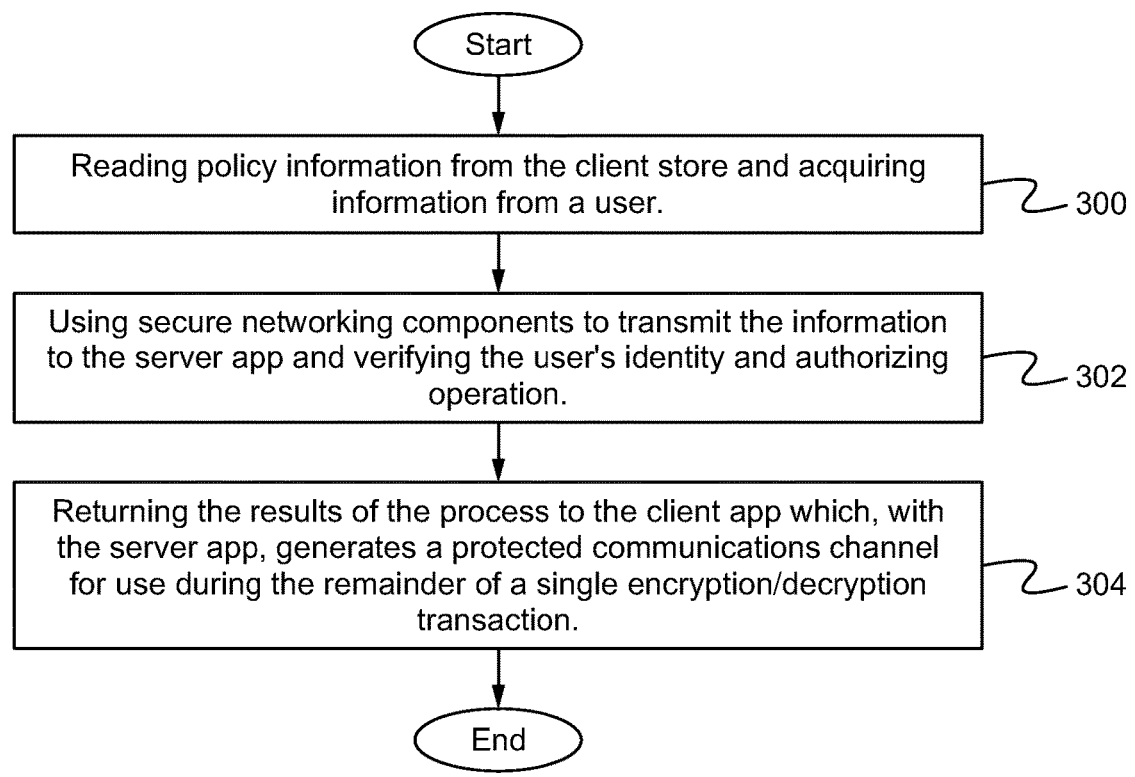
FIG. 3 illustrates a flowchart of a method of authentication according to some embodiments.

FIG. 3 illustrates a flowchart of a method of authentication according to some embodiments. In the step 300, for authentication, the client application first securely stores an event associated with this action, to the local client store, then reads policy information from the client store to determine user identity and as a result, prompts/queries the user for a password, unless it is securely stored from a previous operation using a configurable timeout value in which case it re-uses a (salted) password hash (or similar), then acquires a second authentication factor by prompting the user to touch an external USB token provided (e.g., FIDO), and configured for a single user, which then generates a unique One-Time Password. In some embodiments, the second factor (or second factor authentication information) is optionally queried. As described herein, the second authentication factor may require an externally-connected device such as a USB token, mouse, phone, custom device, any other device, and/or human touch to generate a One-Time Password, or changing passcode, that is either read from third-party software libraries or as redirected keyboard output. In the step 302, the client application uses secure networking components to transmit the information to the server application, where it first securely stores an event associated with this action, to the local server store, then verifies the user's identity and authorizes operation. In the step 304, the results of the process are, with secure networking components, returned to the client application which, with the server application, creates a protected communications channel for use during the remainder of a single encryption/decryption transaction. This is a prerequisite for the client and server to execute coordinated encryption/decryption operations; if the server application cannot authorize the user, the response does not setup the proper protected session. In some embodiments, fewer or additional steps are implemented. In some embodiments, the order of the steps is modified.

Figure 4:
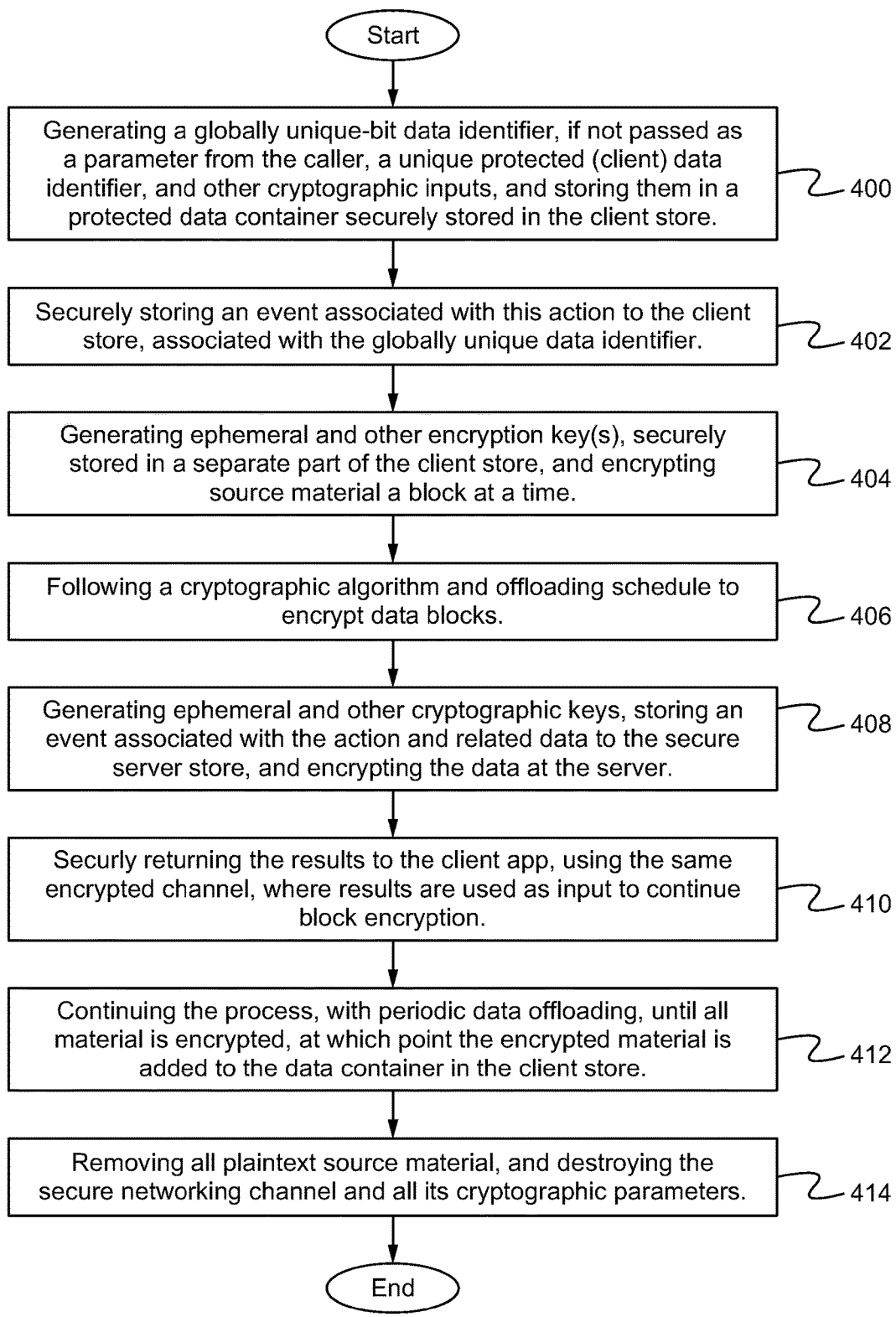
FIG. 4 illustrates a flowchart of a method of encryption according to some embodiments.

FIG. 4 illustrates a flowchart of a method of encryption according to some embodiments. In the step 400, for encryption, the client application creates a globally unique data identifier, if not passed as a parameter from the caller (see below), a unique protected (client) data identifier, and other cryptographic inputs, and stores them in a protected data container securely stored in the client store. In the step 402, the client application also securely stores an event associated with this action to the client store, associated with the globally unique data identifier. In the step 404, the client application also creates ephemeral and other encryption key(s), securely stored in a separate part of the client store, and begins to encrypt source material a block at a time. By using secure networking components and a secure network channel negotiated as a result of server application authentication previously described, and based on configuration data returned when authentication succeeded, the client application follows a cryptographic algorithm and offloading schedule to encrypt data blocks or periodically send (offload) a plaintext block of material (or encrypted material) and cryptographic inputs to the server application, in the step 406. In the step 408, the server application uses the cryptographic input and plaintext data (or encrypted data), generates (or retrieves if not the first time for a given encryption operation) ephemeral and other cryptographic key(s) associated with and unique and specific to the current operation and source data, stores an event associated with this action and related data, to the secure server store, and encrypts the block of data storing this, the client data identifier, associated cryptographic input parameters, and encrypted text in a data container in the secure server store while also storing the cryptographic key(s) in a separate, secure portion of the server store. In the step 410, the server application then securely returns the results of this operation to the client application, using the same encrypted channel previously noted, where results are used as input to continue block encryption. This process continues, with periodic (or complete) data offloading, until all material is encrypted, at which point the encrypted material is added to the data container in the client store, in the step 412. The client application then removes all plaintext source material, and the secure networking channel and all its cryptographic parameters are destroyed, in the step 414. In some embodiments, fewer or additional steps are implemented. In some embodiments, the order of the steps is modified.

Figure 5:
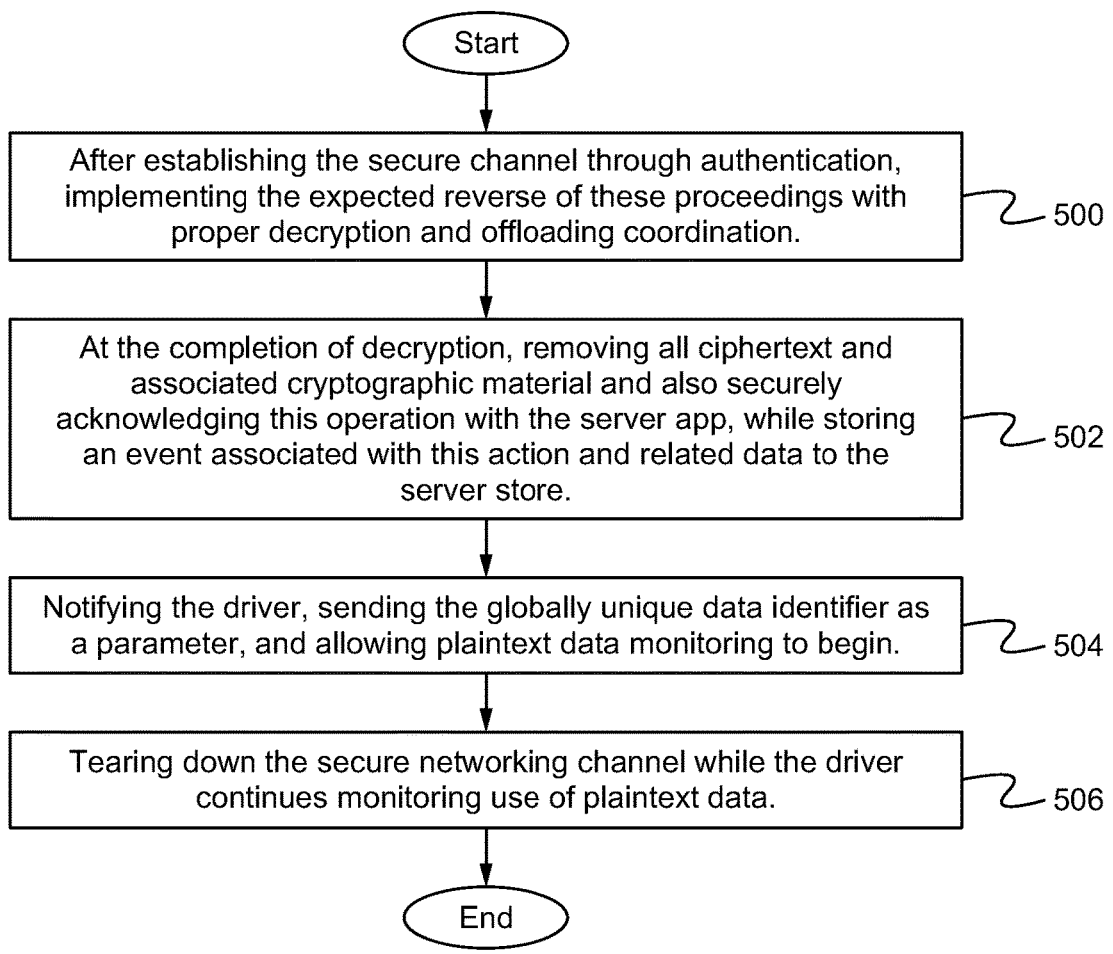
FIG. 5 illustrates a flowchart of a method of decryption according to some embodiments.

The resulting encrypted data content is composed of an "outer" data container, with data encrypted using unique server-generated and server-stored cryptographic key(s), and an "inner" data container encrypted using the securely stored client cryptographic key(s). FIG. 5 illustrates a flowchart of a method of decryption according to some embodiments. In the step 500, for decryption, the client application and server application, after establishing the secure channel through authentication previously described, implement the expected reverse of these proceedings with proper decryption and offloading coordination. In some embodiments, the server-stored decryption key associated with the encrypted item's unique identifier is delivered. Content on the client is decrypted first using the delivered server key, then using the locally stored client key to obtain plaintext content. Plaintext is managed using a secure, isolated channel such that content remains protected from external access requests while the plaintext is being used, after decrypted, and before re-encryption when information is saved and closed. At the completion of decryption, the client application removes all ciphertext and associated cryptographic material and also securely acknowledges this operation with the server application, which does the same, in the step 502, while storing an event associated with this action and related data to the server store. In the step 504, the client application then notifies the driver, sending the globally unique data identifier as a parameter, allowing plaintext data monitoring to begin. In the step 506, the secure networking channel tears itself down while the driver continues monitoring use of plaintext data, and when no longer being used the driver notifies the client application to re-encrypt. In this case, the driver invokes data encryption as previously described though it sends as an additional parameter the globally unique data identifier. This permits tracking of this data and its changes through multiple encryption/decryption operations which are otherwise completely decoupled. In some embodiments, fewer or additional steps are implemented. In some embodiments, the order of the steps is modified.

As users and processes interact with system resources, calls to interrogate the client store for information about or within any encrypted or protected file created by this system are intercepted by the driver. In the case of enumeration, the driver hides the details of the data container and returns information to the caller such that the data container appears nearly identical to the original plaintext file. When users or applications request access to the data, the driver intercepts the call and dispatches authentication and encryption requests to the client application software, which executes the associated described procedures. Upon completion, the driver then returns references to decrypted data, allowing the requestor to utilize the secure data container in a native fashion. As previously described, the driver also monitors use of the decrypted data and dispatched authentication and encryption with the client application to re-protect and store any changes. For all of these proceedings, calls intercepted by the driver are packaged into event information records and securely stored in the client store and also with secure networking sent to the server application, where it stores event data through an association with the unique data identifier.

The advanced data protection system may also have one or more of the following optional components:

a) Physical presence authentication tokens, which seek to require verification of a physical human presence providing authentication with intent, b) Client system shell extensions, exposing encrypt/decryption commands through a user interface that is consistent with other file-based software programs, and as intended by the operating system, invoking encrypt/decrypt functionality with secure calls to the client application, c) Client driver, responsible for intercepting all protected data access requests, and holding this request while the driver initiates a decryption procedure by securely invoking the client application, at which point the response contains references to the newly decrypted data. The driver also, by working with shell extensions, modifies protected data enumeration requests to insulate any client store modification required to differentiate a stored protected entity from a chunk of natively stored plaintext data, with the goal of providing a seamless and native user experience independent of protected or unprotected data in the client store, d) Client monitoring software component, working with or as a part of the optional client driver, which takes input from the client application, monitors both data container and plaintext file access events, and reads/write data from/to the client store, e) Administrative software extension to the client application, provide remote configuration capabilities for encapsulating application configuration. This is in some ways preferred to a web-based interface, which due to the tools and features normally found in web presentations, presents additional security challenges, f) Server database, running on the same computer as the server application, or remote from both client and server computers, usually connected to the same subnet as the server application computer, and in a monitored and protected environment, containing policy configuration and structured data access event history data suitable for reporting.

The advanced data protection system may also have one or more of the following optional procedures:

a) Client and server applications, and also the client monitoring software, together monitor all data access attempts to encrypted data containers in the client store, and also associated client store plaintext data, and also client and server applications, during encryption and decryption processing, collect and store event information in the associated store, associated with the unique data identifier, and in the case of the client application, with secure networking components, sends this information to the server application where it securely saves the information in the server store, b) After encryption, and by notification from the client application, the client monitoring software component tracks all system resources using plaintext data, detecting the point at which plaintext data use dependencies are all removed, optionally initiates re-encryption of the plaintext material by securely invoking client application software interfaces, c) During encryption, the client application optionally creates a globally unique random data identifier, which can be used by external data protection systems to deterministically associate dataflow content with source data managed by the advanced data protection system, and in correlation with the generated historical data event log securely stored in the server store, d) Optionally, client and server applications may implement encryption in a serial fashion generally as follows: The client application encrypts local plaintext data, sends the encrypted result to sever application software, and the server encrypts the already-encrypted file, returning the result to the client application. In this case, during decryption, the client application requests from the server the key required to decrypt the data, and the client application uses this key to perform the first decryption, then uses local cryptographic key(s) information and data container stored cryptographic parameters to decrypt the resulting data, finally arriving at plaintext material, e) The system may include a protected Restore operation, which as a prerequisite requires the previous serial encryption/decryption implementation. During encryption, the server application securely stores a copy of its encryption data (and associated data container information as previously noted) which permits a client application operation that brings all protected materials down to the client. This is very useful in providing an alternative to secure, selective backup/restore capabilities that are specifically useful when mitigating risk to Ransomware, f) User interface exposed through the notification interface, permitting users to view data access event history, initiate encrypt, decrypt, and restore operations, and make configuration changes (when authorized); this interface may have administrator capabilities only exposed to certain users as defined in the Server database and implemented with server application extensions, g) Shared data decryption may be implemented with modifications to the encryption/decryption procedures as described, and in conjunction with the creation and management of individual user asymmetric public/private key pairs, and also the creation and management of asymmetric public/private key pairs associated with Groups of Users. Groups represent a logical construct that may be arbitrary, but must be consistent, and likely represent an Organization of Users, a Team of Users, or any other construct that maps to real-world cases. As such, secured data sharing is then made up of considerations for sharing data between Users within a Group, and securely sharing data between Users in different Groups. Both make use of asymmetric key pairs specific to the associated Users and their respective Groups, or logical containers. Sharing between Users within a Group is a simple extension of the general data encryption and decryption process, with the added use of the Group's public/private key pairing used as a wrapper around the symmetric host encryption/decryption key, as follows: when a file is encrypted, the host encryption key is wrapped, or further protected, with the Group's public asymmetric key. This wrapped key is then delivered to the Server for later use, based on policy consistent with previously noted procedures for utilizing the host decryption key. Decryption then requires the additional step of both delivering to the requesting User the wrapped host symmetric encryption/decryption key, and the subsequent steps for the User to unwrap the key using the Group's private asymmetric key (since the host decryption key is not in the local host store). Sharing between Users in the same Group, and between Users in different Groups, now becomes a management facility for delivering Group public/private keys pairs, based on policy, to participating Users—which in general can and should permit automatic data sharing between Group peers, e.g., automatic delivery of the containing Group's asymmetric key pair to each participating User, and formal actions associated with authorization for one-way trust associations between a single Group's User or set of Users, and an, "external" User in another Group, resulting in the sharing of the Group's asymmetric key pair with the "external" User. This association is one-way, and permits data sharing to the remote User in another Group, for a potentially limited duration, which can be managed by Server-specific Policy, with the reciprocal being an additional configuration step that can be automated, assumed, or can also require a specific individual administrative action. This then facilitates sharing from a single User to multiple recipients by wrapping the host symmetric encryption/decryption key with the Group's public key, and insuring that authorized User recipients, as a matter of Policy and Administrative action/management, all have the associated Group asymmetric private key, since the host symmetric decryption key will then be delivered in this fashion. Revocation and disabling of authorized "external" trusted sharing peers then becomes a matter of Policy, limiting delivery of the wrapped key from the Server to a requesting User, or by generating a new public/private key pair associated with one or more Groups. Delivery of the Group's asymmetric key pair can be facilitated through the use of the User's own public/private key pair, provisioned when the User is created, and by sharing the User's public asymmetric key with the Server. This then creates a facility for securely sharing Group private asymmetric keys to individual Users, without exposing the private key to the Server—retaining the requirement of keeping plaintext data out of the Server's reach, cryptographically; the Server must never have enough material, at any time, or through retained information over time, to acquire plaintext access to any client data, whether associated ciphertext is available to the Server or made available to the Server even through nefarious means. This procedure supports this fundamental data sharing requirement and final realization.

h) During encryption, when the client application removes all remnants of plaintext material, it optionally and based on policy identifies all cached source material such as Microsoft Office® documents, and removes the cached version. The application does this with a secure wipe algorithm i) During encryption, the client and server application may agree to implement data integrity protection, either through substitution of encryption with a suitable transform, for example replacing standard symmetric AES-CBC with AES-GCM, or by method of Generic Composition, such as the proper and careful combined use of AES-CBC with HMAC-SHA256/512. Either approach can be applied to secure communication and/or protected data, by extending ephemeral and other key generation and related storage techniques to handle additional cryptographic materials in similar fashion to that noted, and associated with unique client and server identifiers. Transform negotiation can be a specific part of the secure communications protocol, utilizing related capabilities available with industry standards, and/or by use of custom implementations and higher-level protocol constructs, and/or part of Administrative Policy Management, and/or simple version-based pre-agreement, and/or any similar, suitable, and/or standard combination of any or all of these methods.

The system described herein was independently designed to protect data on hosts compromised by malicious applications or which rely upon credentials that have been stolen by unauthorized actors. In order for these protections to be effective, two-factor authentication is included in system configuration and data access authorization; the unique integration of these systemic processes realizes a solution that is otherwise not seen in other product. Additional protection is realized when at least one authentication factor seeks to require a physical and verifiable human presence with intent to authenticate, though it should be done so in a simple fashion requiring very little effort and/or processing delay. The seamless integration of protected files into a relatively normal and uninterrupted workflow, with only minor variations to the way unprotected files are accessed, makes the enhanced solutions usable; reaching this end-result with the authentication factors, in ways that require additional end-user participation or impose unreasonable delays, threatens to diminish acceptance of the end-result, or renders the implementation impractical for real-world use.

Figure 6:
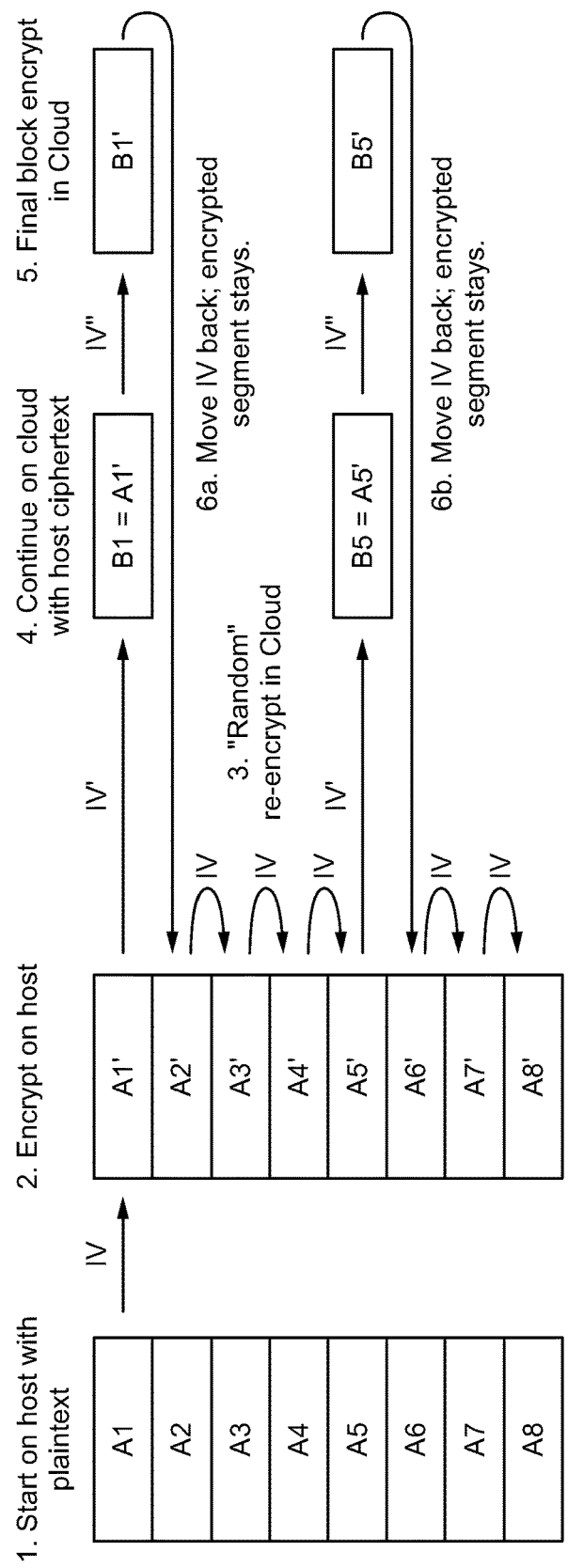
FIG. 6 shows dual, optimized CBC encryption offloading according to some embodiments.

FIG. 6 shows dual, optimized Cypher Block Chaining (CBC) encryption offloading according to some embodiments. The process begins on a host with data in plaintext. The data is encrypted on the host. In some embodiments, the data is encrypted using an initialization vector which is a random number of a certain length used with a key. In some embodiments, the data is separated into blocks, and each block is encrypted. In some embodiments, each encrypted block is then sent to a cloud computing device, and each of the blocks is encrypted on the cloud computing device. In some embodiments, random blocks of encrypted blocks are re-encrypted on the cloud computing device. For example, only blocks 1 and 5 are re-encrypted on the cloud computing device.

Figure 7:
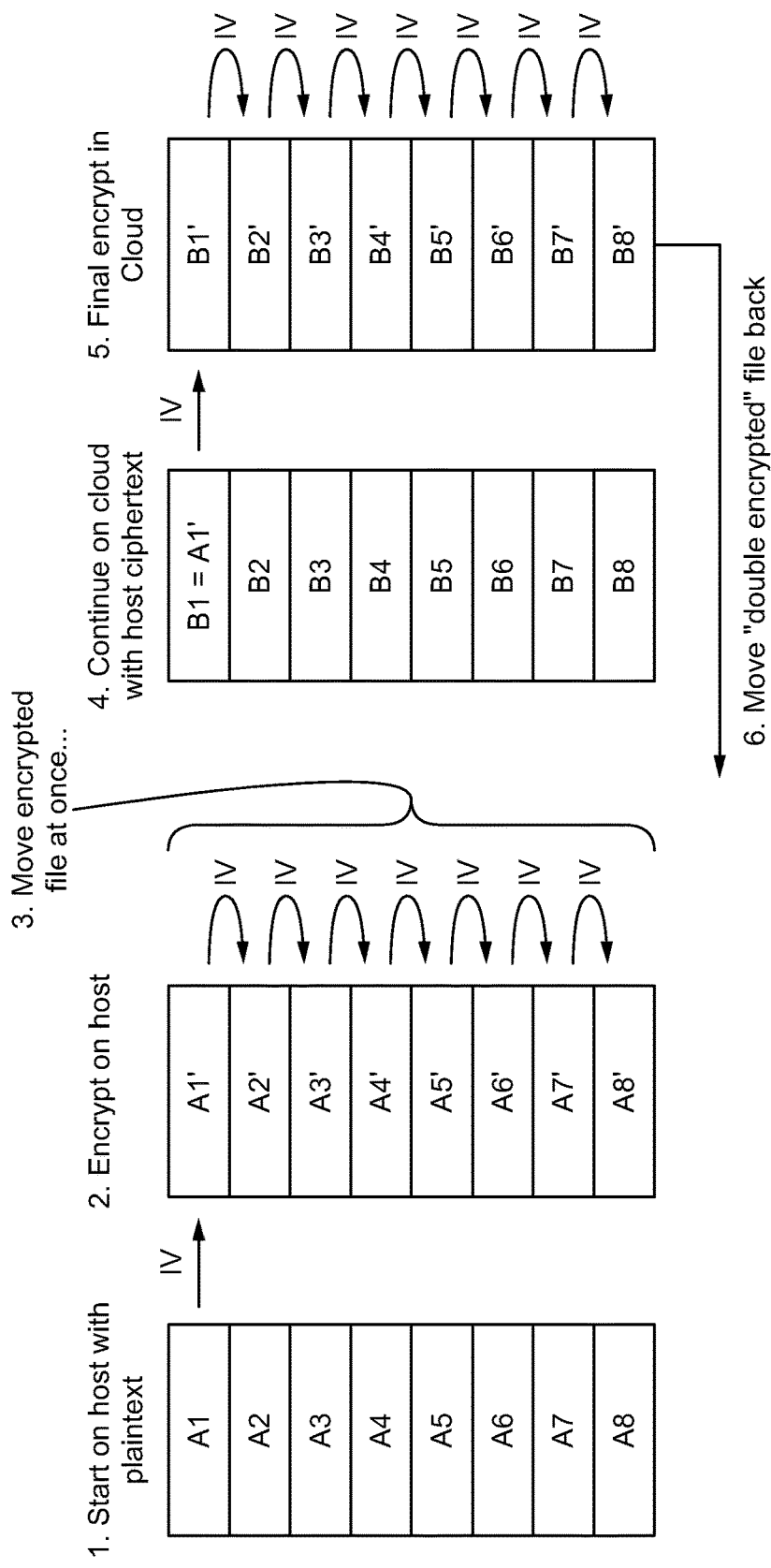
FIG. 7 shows dual, serialized CBC encryption offloading according to some embodiments.
Figure 8:
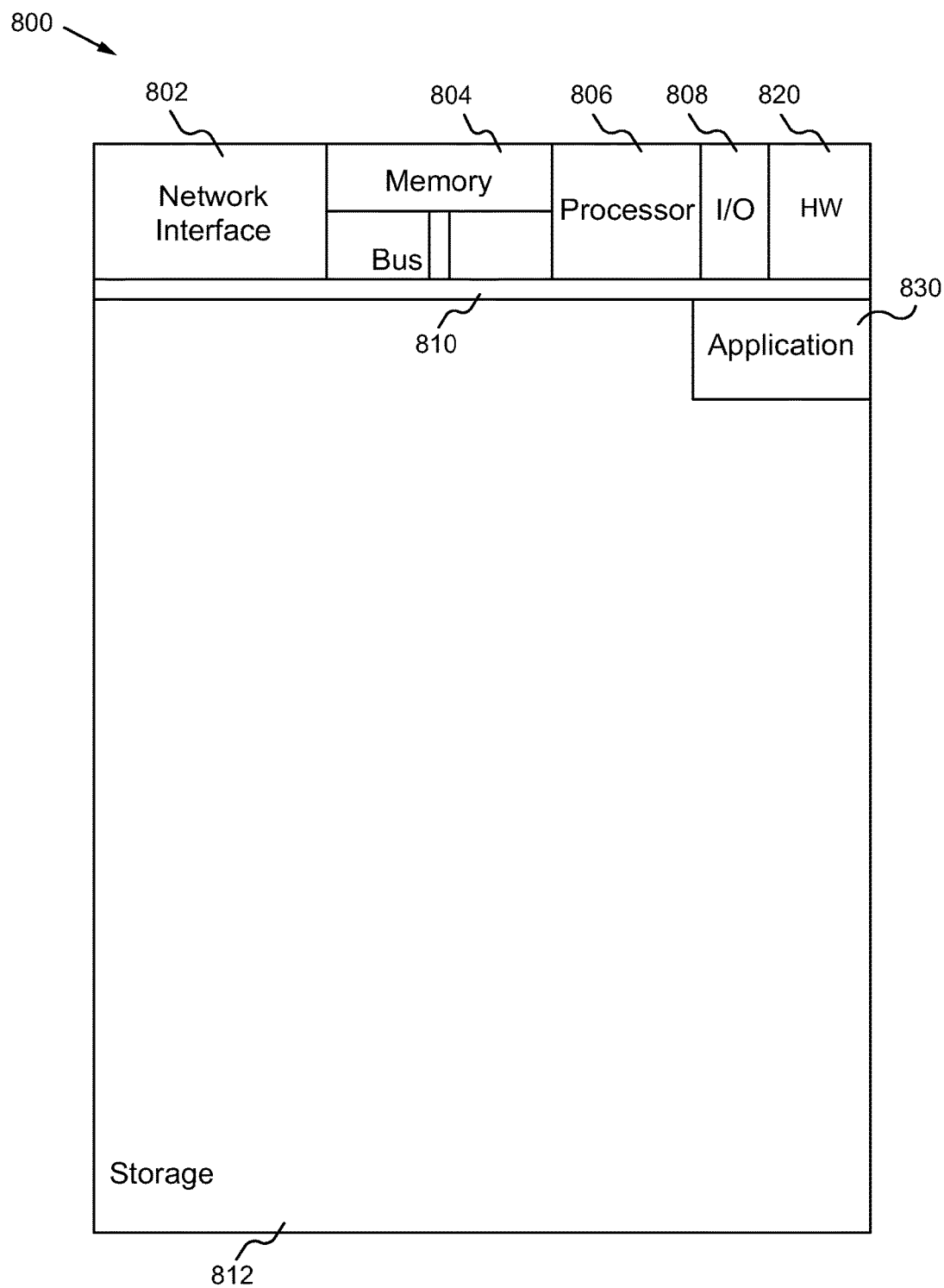
FIG. 8 illustrates a block diagram of an exemplary computing device configured to implement the advanced data protection according to some embodiments.

FIG. 7 shows dual, serialized CBC encryption offloading according to some embodiments. The process begins on a host with data in plaintext. The data is encrypted on the host. In some embodiments, the data is encrypted using an initialization vector which is a random number of a certain length used with a key. In some embodiments, the data is separated into blocks, and each block is encrypted. Then, the entire encrypted file is moved to a cloud computing device. Each encrypted block is then encrypted on the cloud computing device, resulting in a double encrypted file. The double encrypted file is then moved back to the host device. FIG. 8 illustrates a block diagram of an exemplary computing device configured to implement the advanced data protection according to some embodiments. The computing device 800 is able to be used to receive, send, compute, process, communicate and/or display information. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, display, printer, modem, touchscreen, button interface and other devices. In some embodiments, the hardware structure includes multiple processors and other hardware to perform parallel processing. Advanced data protection application(s) 830 used to perform the advanced data protection are likely to be stored in the storage device 812 and memory 804 and processed as applications are typically processed. More or fewer components shown in FIG. 8 are able to be included in the computing device 800. In some embodiments, advanced data protection hardware 820 is included. Although the computing device 800 in FIG. 8 includes advanced data protection applications 830 and advanced data protection hardware 820 for implementing the advanced data protection, the advanced data protection is able to be implemented on a computing device in hardware, firmware, software or any combination thereof. For example, in some embodiments, the advanced data protection applications 830 are programmed in a memory and executed using a processor. In another example, in some embodiments, the advanced data protection hardware 820 is programmed hardware logic including gates specifically designed to implement the advanced data protection.

Examples of suitable computing devices include a personal computer, a laptop computer, a computer workstation, a server, a mainframe computer, a handheld computer, a personal digital assistant, a cellular/mobile telephone, a smart appliance, a smart phone, a tablet computer, a gaming console, a digital camera, a digital camcorder, a camera phone, a video player, a DVD writer/player, a Blu-ray® writer/player, a television, a home entertainment system or any other suitable computing device.

In each embodiment, the nature of requiring cryptographic material from both the client device and the server device has the distinct advantage of insulating end-users on client devices from unilateral legal action designed to recover plaintext material without their knowledge. This is not possible, as reconstructing plaintext requires artifacts from both entities, thus end-users are protected against unknowing disclosure of their protected content.

To utilize the advanced data protection, a user generally does not have to do much, if anything, differently than they usually do to access files. The user is able to access files in a typical manner. In some embodiments, the user specifies which files to protect. In some embodiments, the user verifies authority/access (e.g., using a password, biometrics or any other implementation) before accessing data.

In operation, the advanced data protection securely protects user data, enables backup and restore as well as providing a secure audit implementation.

As described herein, when storing data, a file is retained for further use and future restoration. For example, a file is requested based on a client identifier, which is also embedded in the file itself, and then the file is downloaded.

Audit records are able to be utilized to analyze usage and make a disclosure risk determination based on deterministic use, not on inferences and extrapolation or machine analytics/heuristics. The audit records are able to be used to generate a report so that users are able to prioritize an investigation to determine what may have been taken.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A method, implemented using hardware, comprising:
   a. encrypting content with an inner data container using one or more unique client-generated and client-stored cryptographic keys to generate client-encrypted content; and
   b. sending the client-encrypted content to a server where the client-encrypted content is encrypted with an outer data container using one or more unique server-generated and server-stored cryptographic keys, wherein encrypting the content further comprises:
      implementing a cryptographic algorithm and offloading schedule to transmit client-encrypted data blocks and additional cryptographic inputs to a server application, using secure networking components and a secure network channel negotiated as a result of server application authentication and based on configuration data returned when authentication succeeds;
      using the additional cryptographic inputs, generating or retrieving one or more unique content encryption keys associated with and specific to the client-encrypted content, and encrypting the client-encrypted content in a data container in a secure server store while also storing the one or more server-generated and server-stored cryptographic keys on the secure server store;
      generating a globally unique data identifier and the additional cryptographic inputs, and storing the globally unique data identifier and the additional cryptographic inputs in a protected data container stored in a protected client store using a client application;
      encrypting the content a block at a time; and
      returning results to the client application, using an encrypted channel, where the results are used as input to continue block encryption, until all of the content is encrypted, at which point encrypted material is added to the protected data container in the client store, replacing plaintext input material.

2. The method of claim 1 wherein the one or more client-generated cryptographic keys are stored on the client device.

3. The method of claim 1 wherein encrypting the content further comprises:
   storing an event to the client store, associated with the globally unique data identifier; and
   generating one or more unique encryption keys, stored in a protected part of the client store.

4. The method of claim 3 further comprising removing original content, and destroying the secure network channel and cryptographic parameters.

5. The method of claim 3 wherein authentication further comprises:
   (1) reading policy information from the client store, or from user input, to determine user identity;
   (2) querying a user for a password, or using cached password data in the form of a salted hash and/or key-stretched derived value;
   (3) optionally querying the user for secondary authentication information;
   (4) using secure networking components to transmit the secondary authentication information to the server application which verifies the identity of the user, authorizes operation, and stores, to the server store, an event associated with authentication; and
   (5) generating a protected communications channel for use during the remainder of a single encryption/decryption transaction.

6. The method of claim 5 wherein the secondary authentication factor uses an externally-connected device or software libraries that provide identity and/or authentication material.

7. The method of claim 6 wherein the externally-connected device comprises a USB token or other external device or software application, which requires human interaction to generate a One-Time Password or other authenticating material read from hardware or third-party software libraries.

8. The method of claim 3 further comprising decrypting the content comprising:
   i. establishing a secure channel through authentication;
   ii. delivering the server-stored cryptographic keys associated with a unique identifier of an encrypted item, to the client, using the secure channel;
   iii. decrypting the content on the client first using the server-stored cryptographic key which is delivered, then using the locally client-stored cryptographic key, to obtain plaintext content; and
   iv. removing all ciphertext and associated cryptographic material and acknowledging an operation with the server application using the client application and secure network channel.

9. The method of claim 8 wherein decrypting the content comprises using one or more keys from a client store together with keys delivered by the server, from the secure server store, in response to authentication and authorization.

10. A client device comprising:
   a. a memory for storing an application, the application programmed to perform:
      i. encrypting content with an inner data container using a stored client cryptographic key to generate client-encrypted content; and
      ii. sending the client-encrypted content to a server where the client-encrypted content is encrypted with an outer data container using one or more unique server-generated and server-stored cryptographic keys, wherein encrypting the content further comprises:
         implementing a cryptographic algorithm and offloading schedule to encrypt data blocks and additional cryptographic inputs to a server application, using secure networking components and a secure network channel negotiated as a result of a server application authentication and based on configuration data returned when authentication succeeds;
         using the additional cryptographic inputs, generating or retrieving one or more unique content encryption keys associated with and specific to client-encrypted content, and encrypting the client-encrypted content in a data container in a secure server store while also storing the server-stored cryptographic key on the secure server store;
         generating a globally unique data identifier and the additional cryptographic inputs, and storing the globally unique data identifier and the additional cryptographic inputs in a protected data container stored in a protected client store using a client application;
         encrypting the content a block at a time; and
         returning results to the client application, using an encrypted channel, where the results are used as input to continue block encryption, until all of the content is encrypted, at which point encrypted material is added to the protected data container in the client store, replacing plaintext input material; and
   b. a processor for processing the application.

11. The client device of claim 10 wherein the client-generated cryptographic keys are stored on the client device.

12. The client device of claim 10 wherein encrypting the content further comprises:
   storing an event to the client store, associated with the globally unique data identifier; and
   generating one or more unique encryption keys, stored in a protected part of the client store.

13. The client device of claim 12 wherein the client device is configured for removing original content and destroying the secure network channel and cryptographic parameters.

14. The client device of claim 12 wherein authentication further comprises:
   (1) reading policy information from the client store, or from user input, to determine user identity;
   (2) querying a user for a password or using cached password data in the form of a salted hash and/or key-stretched derived value;
   (3) optionally querying the user for secondary authentication information;
   (4) using secure networking components to transmit the secondary authentication information to the server application which verifies the identity of the user, authorizes operation, and stores, to the server store, an event associated with authentication; and
   (5) generating a protected communications channel for use during a remainder of a single encryption/decryption transaction.

15. The client device of claim 14 wherein the secondary authentication factor uses an externally-connected device or software libraries that provide identity and/or authentication material.

16. The client device of claim 15 wherein the externally-connected device comprises a USB token or other external device or software application, which requires human touch to generate a One-Time Password or other authenticating material read from hardware or third-party software libraries.

17. The client device of claim 10 wherein the client device is further configured for decrypting the content comprising:
   i. establishing a secure channel through authentication;
   ii. receiving the server-stored cryptographic keys associated with a unique identifier of an encrypted item, to the client, using the secure channel;
   iii. decrypting the content on the client first using the server-stored and delivered cryptographic key, then using the locally client-stored cryptographic key, to obtain plaintext content; and
   iv. removing all ciphertext and associated cryptographic material and acknowledging an operation with the server application using the client application and the secure network channel.

18. A server device comprising:
   a. a memory for storing an application, the application programmed to perform:
      i. receiving encrypted content with an inner data container using one or more stored client-generated cryptographic keys; and
      ii. encrypting the content with an outer data container using one or more unique server-generated and server-stored cryptographic keys, wherein encrypting the content further comprises:
         implementing a cryptographic algorithm and offloading schedule to receive client-encrypted data blocks and additional cryptographic inputs for the application, using secure networking components and a secure network channel negotiated as a result of a server application authentication and based on configuration data returned when authentication succeeds;
         using the additional cryptographic inputs, generating or retrieving one or more unique content encryption keys associated with and specific to the client-encrypted content, and encrypting the client-encrypted content in a data container in a secure server store while also storing the server-generated and server-stored cryptographic keys on the secure server store;
         generating a globally unique data identifier and the additional cryptographic inputs, and storing the globally unique data identifier and the additional cryptographic inputs in a protected data container stored in a protected client store using a client application;
         encrypting the content a block at a time; and
         returning results to the client application, using an encrypted channel, where the results are used as input to continue block encryption, until all of the content is encrypted, at which point encrypted material is added to the protected data container in the client store, replacing plaintext input material; and
b. a processor for processing the application.

19. The server device of claim 18 wherein the one or more client-generated cryptographic keys is stored on the client device.

20. The server device of claim 18 wherein encrypting the content further comprises:
returning results to a client application, using an encrypted channel, where the results are used as input to continue block encryption, until all of the content is encrypted, at which point encrypted material is added to the protected data container in a client store, replacing plaintext input material.

21. The server device of claim 18 wherein authentication further comprises:
using secure networking components to transmit secondary authentication information to a server application which verifies an identity of a user, authorizes operation, and stores, to a server store, an event associated with authentication; and
generating a protected communications channel for use during a remainder of a single encryption/decryption transaction.

22. The server device of claim 18 wherein the server device is configured for decrypting the content comprising:
establishing a secure channel through authentication; and
delivering the server-stored cryptographic keys associated with a unique identifier of an encrypted item, to the client, using the secure channel.

23. A system comprising:
a. a client device configured for encrypting content with an inner data container using one or more stored client cryptographic keys to generate client-encrypted content; and
b. a server device configured for encrypting the client-encrypted content with an outer data container using one or more unique server-generated and server-stored cryptographic keys, wherein encrypting the content further comprises:
implementing a cryptographic algorithm and offloading schedule to transmit client-encrypted data blocks and additional cryptographic inputs to a server application, using secure networking components and a secure network channel negotiated as a result of a server application authentication and based on configuration data returned when authentication succeeds;
using the additional cryptographic inputs, generating or retrieving one or more unique content encryption keys associated with and specific to client-encrypted content, and encrypting the client-encrypted content in a data container in a secure server store while also storing the one or more server generated and server-stored cryptographic keys of on the secure server store;
generating a globally unique data identifier and additional cryptographic inputs, and storing the globally unique data identifier and the additional cryptographic inputs in a protected data container stored in a protected client store using a client application;
encrypting the content a block at a time; and
returning results to the client application, using an encrypted channel, where the results are used as input to continue block encryption, until all of the content is encrypted, at which point encrypted material is added to the protected data container in the client store, replacing plaintext input material.

24. The system of claim 23 wherein the one or more client-generated cryptographic keys are stored on the client device.

25. The system of claim 23 wherein encrypting the content further comprises:
storing an event to the client store, associated with the globally unique data identifier; and
generating one or more unique encryption keys, stored in a protected part of the client store.

26. The system of claim 23 wherein the client device is configured for removing original content, and destroying the secure network channel and cryptographic parameters.

27. The system of claim 23 wherein authentication further comprises:
(1) reading policy information from the client store and receiving user identity information;
(2) querying a user for a password, or using cached password data in the form of a salted hash and/or key-stretched derived value;
(3) optionally querying the user for secondary authentication information;
(4) using secure networking components to transmit the secondary authentication information to the server application which verifies an identity of the user, authorizes operation, and stores, to the server store, an event associated with authentication; and
(5) generating a protected communications channel for use during a remainder of a single encryption/decryption transaction.

28. The system of claim 27 wherein the secondary authentication factor uses an externally-connected device or software libraries that provide identity and/or authentication material.

29. The system of claim 28 wherein the externally-connected device comprises a USB token or other external device or software application which requires human touch to generate a One-Time Password or other authenticating material read from hardware or third-party software libraries.

30. The system of claim 23 wherein the client device is configured for decrypting the content comprising:
i. establishing a secure channel through authentication;
ii. delivering the server-stored cryptographic keys associated with a unique identifier of an encrypted item, to the client, using the secure channel;
iii. decrypting the content on the client first using the server-stored cryptographic key which is delivered, then using the locally client-stored cryptographic key, to obtain plaintext; and
iv. removing all ciphertext and associated cryptographic material and acknowledging an operation with the server application using the client application and secure network channel.

31. The system of claim 23 wherein decrypting the content comprises using one or more keys from a client store delivered by the server in response to authentication and authorization.

32. A server device comprising:
a. a memory for storing an application, the application programmed to perform:
i. receiving encrypted content generated by encrypting a content with an inner data container using one or more stored client cryptographic keys, wherein the stored client cryptographic keys are stored on a client device; and ii. encrypting the client-encrypted content with an outer data container using one or more unique server-generated and server-stored cryptographic keys, wherein encrypting the content further comprises:
  implementing a cryptographic algorithm to transmit client-encrypted data blocks and additional cryptographic inputs to the application, using secure networking components and a secure network channel negotiated as a result of a server application authentication and based on configuration data returned when authentication succeeds; and
  using the additional cryptographic inputs, generating or retrieving one or more ephemeral encryption keys associated with and unique and specific to the client-encrypted content, and encrypting the client-encrypted content in a data container in a secure server store, and storing the ephemeral keys in the secure server store
  generating a globally unique data identifier, and storing the globally unique data identifier and the additional cryptographic inputs in a protected data container stored in a protected client store using a client application; and
  returning results to the client application, using an encrypted channel, where the results are used as input to continue block encryption, until all of the content is encrypted, at which point encrypted material is added to the protected data container in the client store, replacing plaintext input material; and b. a processor for processing the application.

33. The server device of claim 32 wherein authentication further comprises:
  using the secure networking components to transmit secondary authentication information to a server application which verifies an identity of a user, authorizes operation, and stores, to the server store, an event associated with authentication; and
  generating a protected communications channel for use during a remainder of a single encryption/decryption transaction.

34. The server device of claim 32 wherein the server device is configured for decrypting the content comprising:
  establishing a secure channel through an authentication; and
  delivering the server-stored cryptographic keys associated with a unique identifier of an encrypted item, to the client, using the secure networking channel.

* * * * *